E. R. McKean.
Cask Gauge.

Nº 105,352.        Patented Jul. 12, 1870.

Inventor

E. R. McKean

UNITED STATES PATENT OFFICE.

EDWIN R. McKEAN, OF NASHVILLE, TENNESSEE.

Letters Patent No. 105,352, dated July 12, 1870.

---

IMPROVEMENT IN CASK-GAUGING INSTRUMENT.

---

The Schedule referred to in these Letters Patent and making part of the same

---

*To all whom it may concern:*

Be it known that I, EDWIN R. McKEAN, of Nashville, in the county of Davidson and State of Tennessee, have invented a new and useful Improvement in Gauging Instruments; and I do hereby declare the following to be a full, clear, and exact description of the same, reference being had to the accompanying drawing, in which—

Figure 1:
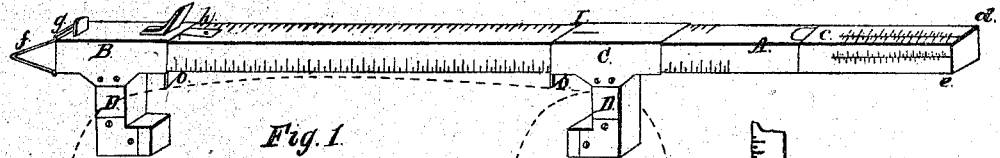

Figure 1 represents the rod as a caliper in taking the length of the cask.

Figure 2:
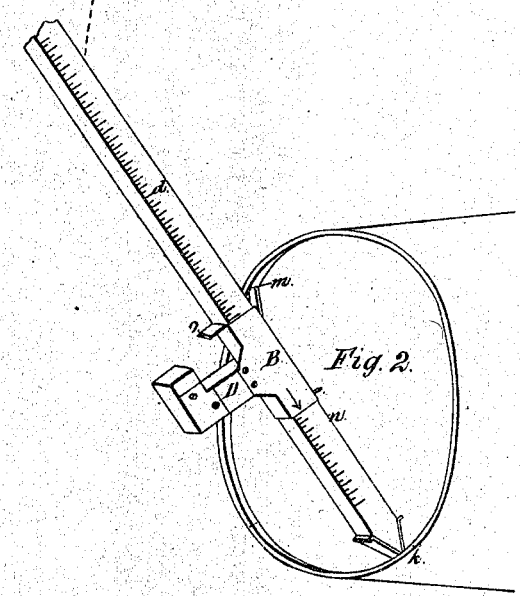

Figure 2, as a head-rod in taking the head-diameter.

Figure 3:
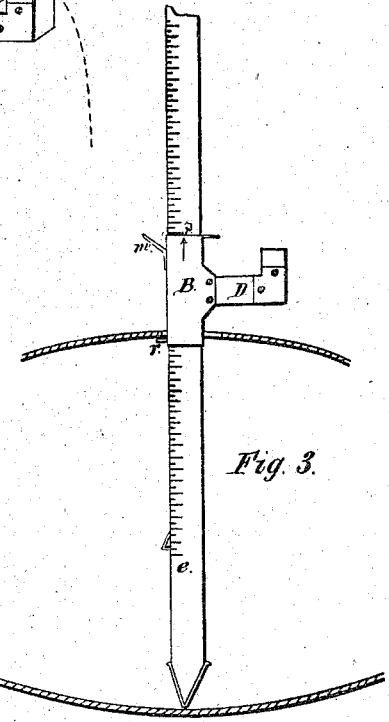

Figure 3, as a bung-rod in taking the bung-diameter.

Figure 4:
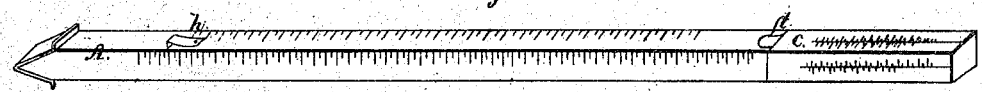

Figure 4, as a straight rod and out-stick.

Figure 5:
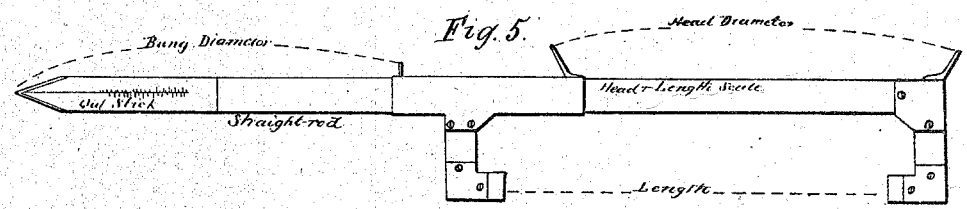

Figure 5, a modification of the same instrument.

My invention consists in a gauging-instrument, combining what is known as the straight rod, for taking the capacity of casks by diagonal measurements; the calipers for taking the length of the cask from the outside; the head-rod, for finding the head-diameter; the bung-rod, for finding the bung-diameter, and the out-stick, for finding the number of gallons out of the cask, so that the gauger requires but one instrument to make all the measurements, and it is constructed that, by detaching the movable parts, a perfectly clean straight rod may be had.

A is a rod, upon one side of which is a scale for the ordinary straight rod, and graduated in gallons and parts, the same being on the under side when in the position as shown by fig. 1.

Upon another face of the rod A, I place a scale graduated in inches and tenths, arranged to read the barrel length in connection with the calipers.

At the opposite or butt end of the rod I inscribe the ordinary out-stick scale $c$.

Upon a third face, $d$, of the rod A is another scale, graduated to inches and tenths, and arranged to read the head diameter, and upon the remaining face of the rod is the scale $e$, graduated also in inches and tenths, and arranged to read the bung-diameter.

B and C are two slides, made to work over the rod A, with projections or arms marked D.

The slide B is slipped on the rod toward the end $f$, which has a mounting of brass or other metal with a small lip, $g$, to prevent it from passing over the rod, while a small, flat spring, $h$, keeps it firm in that position until it is desired to detach it, which can be done by pressing down the spring $h$.

The slide C, similar to B, is then put on, and we have a caliper, and the points of the arms D, coming in contact with the two heads of the cask, will note the length on the rod at I.

The projections or lips $o$ on the under and inner sides of slides B and C, and shown on figs. 1 and 2, are for the purpose of allowing the rod A to rest on the cask in a level position in order to make the measurement more accurate. They may be made rigid, as shown, or with slides to avoid coming in contact with the hoops and thumb-screws, or equivalent devices may be employed to keep them firmly in position.

The slide C is then detached, and the slide B is moved, for the purpose of taking the head-diameter, as shown in fig. 2, the point $k$ of the rod being placed in the chime of the cask, and the slide B moved until the lip $m$ strikes the chime at the opposite side, and the measurement will be found by reading the rod at $n$.

For taking the bung-diameter, place the rod in the cask, as shown in fig. 3, and move the slide B until the lip $r$ touches the under side of the stave at the bung, and, by looking on the rod at $s$, the correct measurement will be given without disturbing the rod or taking it out of the cask, and thus any slipping or derangement of the reading will be avoided.

By detaching the slide B we have a clean, straight rod and out-stick, as shown in fig. 4, the scale for the straight rod being in the under side, and the end of the rod, at $c$, being laid off in gallons, &c., with a movable lip or flange at $t$, for the purpose of going under the stave.

By this arrangement we have an instrument easily worked and carried, not liable to get out of order; one that can be made at small cost, and combining five instruments in one.

In fig. 5 is represented a slight modification of my instrument, performing the same work, combining the same instruments, only differing in the permanency of the arm B in place of a slide, and the transposition of some of the scales and parts. By this arrangement there is but one movable part, and the same scale can be used for both the length and the head-diameter, thus saving one scale.

Having described my invention,

What I claim as new is—

1. An instrument for gauging, in which is combined the straight rod, calipers, head-rod, bung-rod, and out stick, substantially as shown and described.

2. The relative arrangement of the bung-rod, scale, and slide C, so that the measurement can be read without moving the instrument from the cask.

3. The caliper-slides B and C, provided with the arms D, or their equivalents, and with the lips $r$ and $m$, in combination with an ordinary straight rod A, so that, without any additional parts, the length, head-diameter, and bung-diameter of the cask may be taken.

4. The lips or projections $o$ on the slides B and C, for the purpose of resting on the cask and keeping the rod in a level position.

E. R. McKEAN.

Witnesses:
R. D. O. SMITH,
C. A. HARKNESS.